United States Patent [19]
Fenton

[11] Patent Number: 5,842,673
[45] Date of Patent: Dec. 1, 1998

[54] LUGGAGE HOOK STRAP

[75] Inventor: Timm Fenton, Somerville, N.J.

[73] Assignee: Tumi Luggage, Inc., Middlesex, N.J.

[21] Appl. No.: 649,527

[22] Filed: May 17, 1996

[51] Int. Cl.$^6$ ..................................... A45C 5/14
[52] U.S. Cl. ...................... 248/309.1; 190/102; 24/599.5
[58] Field of Search ................................ 248/309.1, 304, 248/305; 24/599.5, 599.9, 598.7, 601.1, 601.2; 190/27, 102, 15.1

[56] References Cited

U.S. PATENT DOCUMENTS

| | | |
|---|---|---|
| 523,953 | 7/1894 | Albershardt . |
| 630,064 | 8/1899 | Martindale ............................. 24/599.9 |
| 2,319,729 | 5/1943 | Ford . |
| 3,692,218 | 9/1972 | Friedman . |
| 3,958,731 | 5/1976 | Riedle . |
| 4,114,234 | 9/1978 | Hogenson . |
| 4,118,840 | 10/1978 | Fengels .................................. 24/599.5 |
| 4,122,585 | 10/1978 | Sharp et al. ....................... 24/599.5 X |
| 4,206,940 | 6/1980 | Altabe ................................ 24/599.9 X |
| 4,309,052 | 1/1982 | Drayton ............................ 24/599.5 X |
| 4,599,767 | 7/1986 | Kasai .................................... 24/601.2 |
| 4,617,704 | 10/1986 | Kasai . |
| 4,622,724 | 11/1986 | Dupre ................................. 24/601.2 X |
| 4,691,416 | 9/1987 | Nakayama et al. ................ 24/601.2 X |
| 4,977,647 | 12/1990 | Casebolt ................................ 24/599.5 |
| 5,020,843 | 6/1991 | Lucas ................................ 24/599.5 X |
| 5,257,441 | 11/1993 | Barlow .................................... 24/599.5 |
| 5,311,972 | 5/1994 | Plath . |
| 5,351,793 | 10/1994 | Gibbs . |
| 5,361,464 | 11/1994 | Bunnell ................................. 24/599.5 |
| 5,501,308 | 3/1996 | King . |
| 5,547,052 | 8/1996 | Latshaw ............................ 190/15.1 X |
| 5,577,787 | 11/1996 | Klope ................................ 24/599.5 X |
| 5,593,009 | 1/1997 | King .................................... 190/108 X |
| 5,671,514 | 9/1997 | Matoba et al. ......................... 24/601.2 |

*Primary Examiner*—Ramon O. Ramirez
*Assistant Examiner*—Long Dinh Phan

[57] ABSTRACT

A removably attachable hook strap for holding auxiliary luggage which comprises a strap having two ends, one end comprising a means for removably attaching to a main piece of luggage, a rigid hook having a distal and a proximal end, the proximal end being joined to the other end of the strap, a member having a first and second end, the first end being fixed to the proximal end of the rigid hook and a means for detachably fastening the second end of the member to the distal end of the rigid hook.

15 Claims, 4 Drawing Sheets

LUGGAGE HOOK STRAP

BACKGROUND OF THE INVENTION

Large pieces of luggage for carrying articles of clothing, personal items and the like, have traditionally been transported by lifting the luggage using a carrying handle. More recently, however, these larger pieces of luggage have been mounted on wheels and a handle or tether has been used to push or pull the luggage on its wheels. This type of wheeled luggage has met with considerable acceptance because greater weights can be transported with relative ease. To further take advantage of the convenience of wheeled luggage, devices have been developed for attaching auxiliary pieces of luggage to the wheeled main luggage to facilitate the simultaneous transportation of all luggage with ease.

In many situations, the traveler carries separate, smaller auxiliary bags such as a briefcase, purse or equipment case, for stowing last-minute articles, objects that will not fit within the primary piece of luggage, or items that the traveler may need frequent and/or ready access to during the journey. These auxiliary articles or stowage bags often are propped onto the wheeled luggage or lashed, or otherwise fastened, in place by an arrangement of hooks, buckles, snaps and bungee cords, allowing the traveler to move an aggregation of luggage between, for example, the airplane, the air terminal, and ground transportation.

However, if it is necessary for the traveler to detach these auxiliary articles quickly at any point during the journey, conventional securement or attachment devices such as buckles, snaps, bungee cords, etc. can prove awkward or time-consuming for the traveler to disconnect, particularly in crowded environments. Moreover, when traveling with auxiliary pieces of luggage, such as a briefcase or purse, the attachment of an auxiliary piece of luggage in a fashion which allows for easy access often leaves the traveler vulnerable to risk of loss or pilferage.

To date, removable hooks or straps designed for the purpose of attaching auxiliary pieces of luggage to a main piece of luggage, have either consisted of an open hook, providing easy accessibility but risk of pilferage, or consisted of straps which provide security but compromise easy accessibility.

SUMMARY OF THE INVENTION

The present invention provides a removably attachable luggage hook strap for attaching an auxiliary piece of luggage to a main piece of luggage in such a manner as to provide both, easy accessibility to the auxiliary piece of luggage and security from risks of loss or pilferage.

The present invention is embodied in a removably attachable hook strap for holding auxiliary luggage which comprises a strap with two ends, one of which removably attaches to the main piece of luggage the other of which is attached to a rigid hook, over which the handles of the auxiliary pieces of luggage can rest. The rigid hook has two ends, a distal end and a proximal end, the proximal end being joined to the strap. A member having one end fixed at the proximal end of the rigid hook, is loose at the other end, thereby allowing it to detachably fasten to the distal end of the rigid hook.

Other objects and advantages of the present invention will become more readily apparent from the following discussion of preferred embodiments.

DETAILED DESCRIPTION

Figure 1:
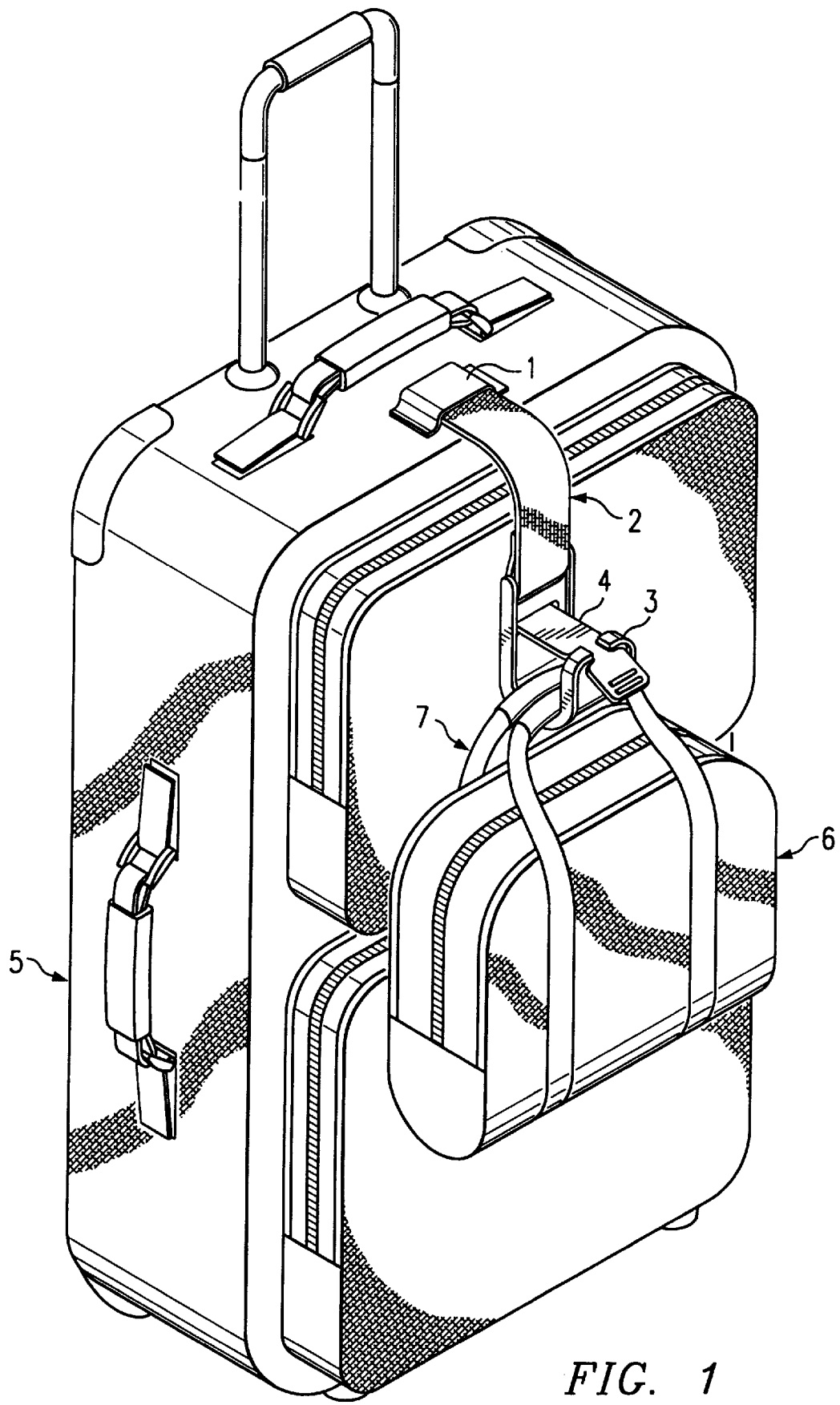
FIG. 1 shows the present invention as it would be used on a main piece of luggage to attach an auxiliary piece of luggage.

A person towing the luggage 5 from place to place can also carry a conventional separate, or auxiliary, piece such as the attache case 6, with the luggage, thereby leaving the person with one hand unencumbered by that separate piece. This is accomplished by attaching the end of the strap 1 to a complimentary fastener on the main piece of luggage, leaving the rigid hook 3 and member 4 extending downwardly from the top along the upper end of the luggage as shown in FIG. 1. The attache case (or auxiliary piece of luggage) 6 is laid along the side of the luggage with its handle(s) 7 slipped over the rigid hook 3 supported by the strap 2. The member 4 may be fastened to provide security or left open to provide easy access to the auxiliary piece of luggage.

Figure 2:
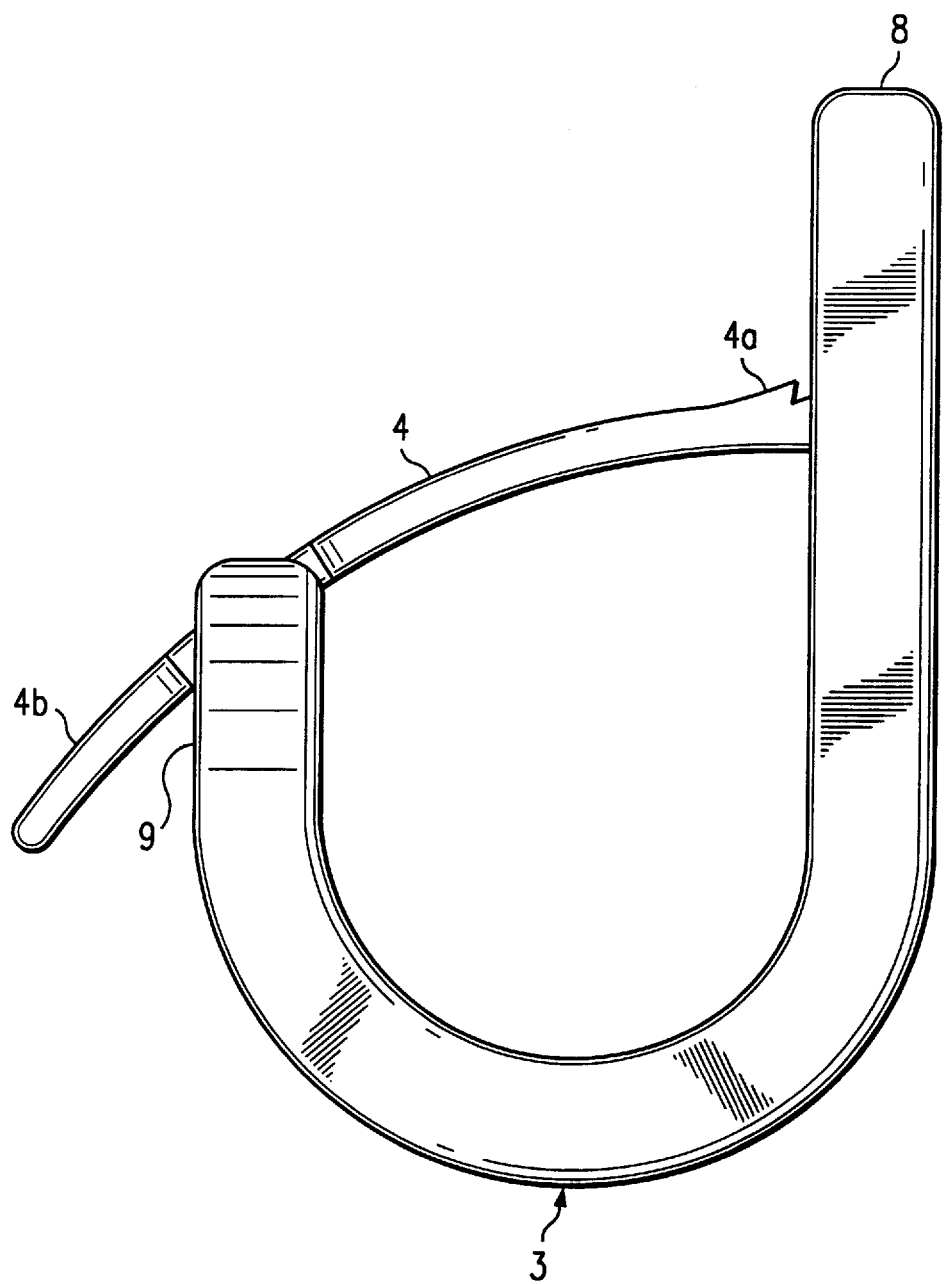
FIG. 2 hows a side view of the rigid hook and member.

FIG. 2 shows a side view of the rigid hook 3 and member 4. The proximal end 8 of the rigid hook is connected to the strap (not shown in FIG. 2). The first end of the member 4a is fixed to the rigid hook at the proximal end. The second end of the member 4b can be easily detachably fastened at the distal end 9 of the rigid hook.

The strap can be made of any material known to and used by those of ordinary skill in the art for luggage straps. Popular examples include leather and nylon. Means for removably attaching the strap to the main piece of luggage are also well known in the art and may, for example, comprise a buckle or snaplike mechanism.

The rigid hook can be made from any sturdy, rigid material capable of bearing the weight of auxiliary pieces of luggage and not susceptible to breakage. In the preferred embodiment the rigid hook is a molded plastic.

The member can be rigid or flexible. In the flexible embodiment, preferred materials include any durable fabric such as leather or nylon. In a preferred embodiment the member is flexible and made of an elastomeric polymer. If rigid, the member, again, should be made of a durable material not susceptible to breakage or cracking, for example, a molded plastic.

The detachable fastening means has many embodiments. Those of ordinary skill in the art would know of many means of securing the second end of the member to the distal end of the hook in a fashion which allows the user to easily unfasten the ends. Several different means are exemplified in the embodiments of the invention which are described in the examples below.

EXAMPLE 1

Figure 3:
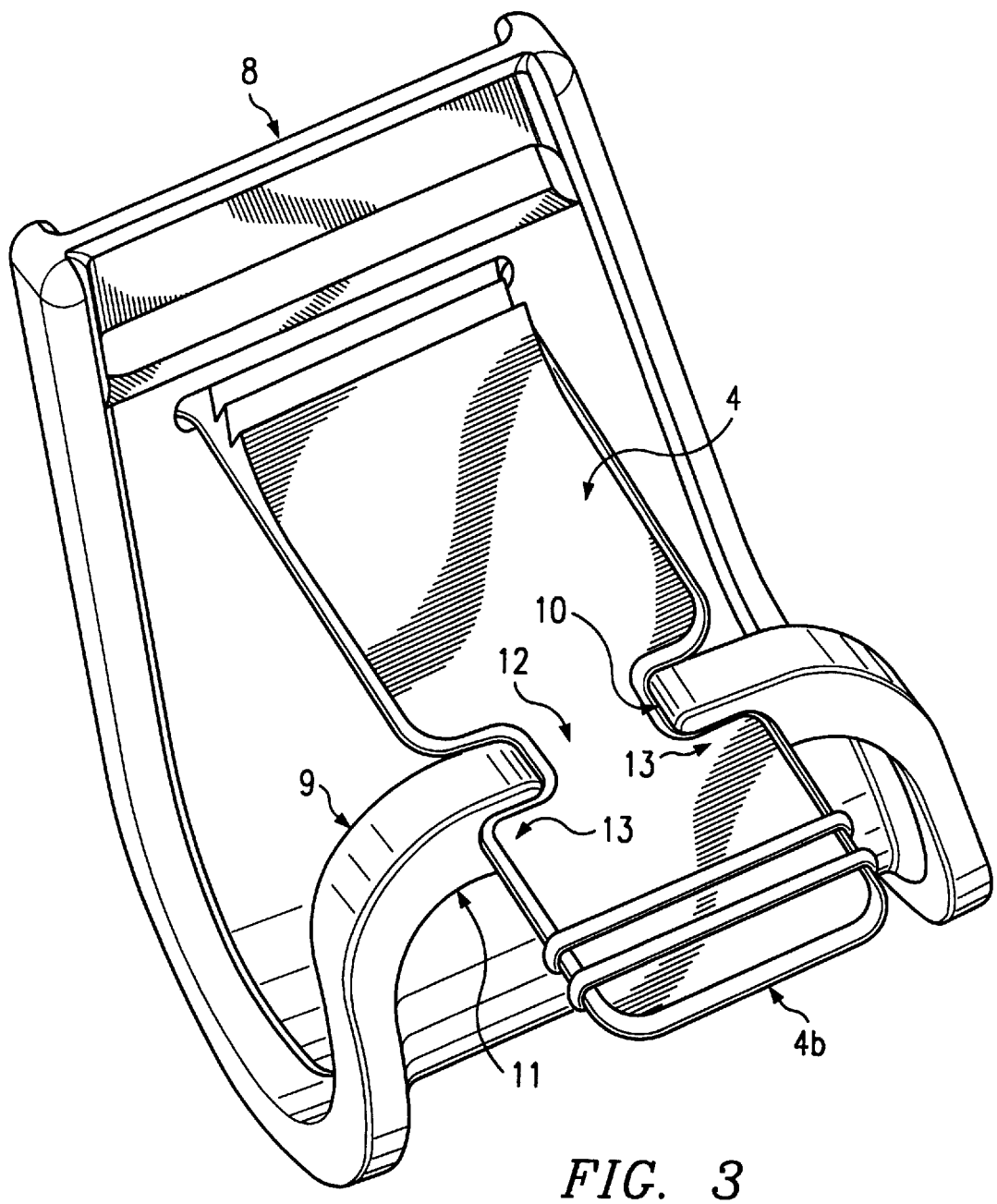
FIG. 3 shows an angled view of an embodiment of a fastening means of the rigid hook and member wherein the member is flexible and not fully fastened at its second end.

FIG. 3 shows an angled view of one embodiment of the claimed invention. The member 4 is flexible and made of an elastomeric polymer. The means of detachably fastening the second end 4b of the member to the distal end 9 of the rigid hook comprises a slot 10 cut out of the distal end of the rigid hook. The distal end of the rigid hook further comprises a lipped edge 11. The flexible member has a narrowed section 12 at its second end. The narrowed section 12 fits snuggly into the cut out slot 10 of the distal end of the rigid hook. The wider section of the member 13 catches the lipped edge 11 of the rigid hook, thus preventing unfastening of the member from the hook. Thus, FIG. 3 does not show the embodiment in a fastened state. If the second end 4b of the member was fully fastened/secured to the distal end of the rigid hook the corners 13 of the flexible member would be found under the lipped edge 11 of the rigid hook.

EXAMPLE 2

Figure 4A:
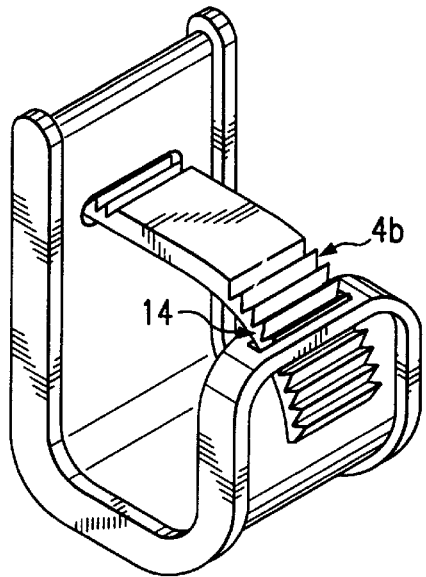
FIGS. 4a–d show angled views of alternative embodiments of the fastening means of the rigid hook and member.

FIG. 4a shows an angled view of another embodiment of the invention whereby the distal end of the rigid hook has a slot-like aperture 14 and the flexible member has a ridged second end 4b. The ridged second end 4b of the member is fed through the slot-like aperture of the distal end of the rigid hook to fasten the two ends.

EXAMPLE 3

Figure 4B:
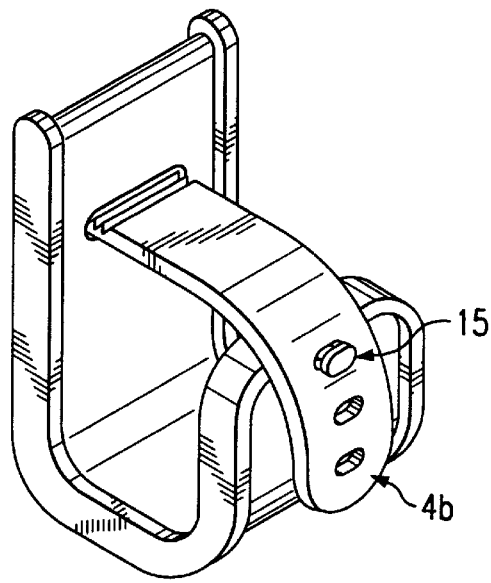

FIG. 4b shows an angled view of yet another embodiment of the invention whereby a stud 15 protrudes outwardly from the distal end of the rigid hook. The second end of the member 4b has a series of apertures capable of receiving the stud 15.

EXAMPLE 4

Figure 4C:
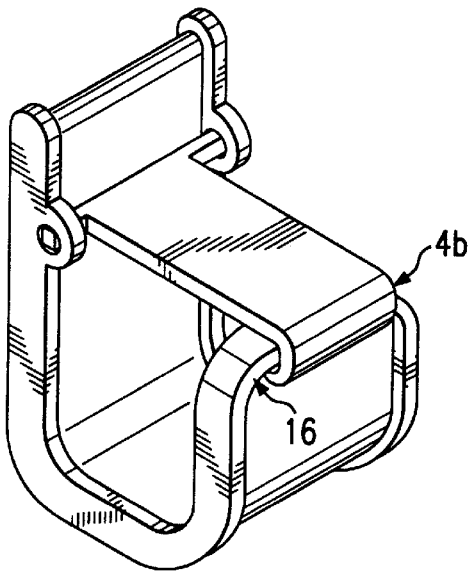
Figure 4D:
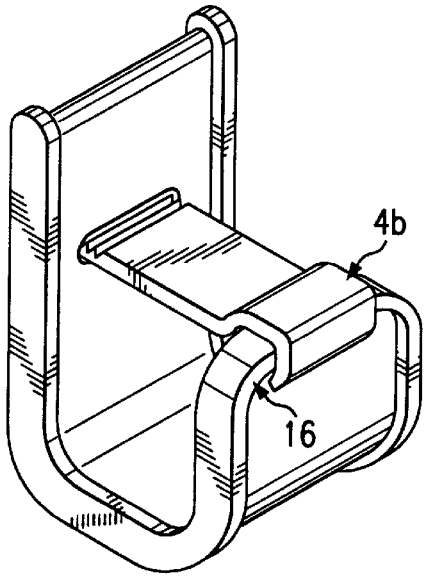

FIG. 4c and 4d show angled views of another embodiment of the invention. The member can be rigid, as in FIG. 4c, or flexible, as in FIG. 4d. In either embodiment the distal end of rigid hook has a lipped edge 16 and the second end of the member 4b is capable of snapping over and catching the lipped edge 16.

It will be apparent to those skilled in the art that the invention may be embodied still otherwise without departing from the spirit and scope of the invention claimed.

What is claimed is:

1. A hook strap for holding an auxiliary piece of luggage on a main piece of luggage, comprising
    a strap having a first end and a second end, the first end being adapted to be attached to the main piece of luggage;
    a rigid generally J-shaped hook having a proximal leg portion, a distal leg portion and a loop portion between the leg portions defining a receptacle that is adapted to receive a part of the auxiliary piece of luggage, the proximal leg portion of the hook being attached to the second end of the strap and the receptacle having a top opening between the leg portions and above the loop portion to permit the part of the auxiliary piece of luggage to be received and held in the receptacle; and
    a closure member having a first end and a second end, the first end of the closure member being joined to the proximal leg portion of the hook, the closure member extending across the top opening of the receptacle, the closure member having a formation adjacent the second end that detachably couples to a projection on the distal leg portion of the hook, and the closure member being displaceable away from the receptacle when the formation on the second end is uncoupled from the projection.

2. The hook strap according to claim 1, wherein the projection on the distal leg portion of the hook is a lipped edge and the formation on the closure member snaps over and catches under the lipped edge.

3. The hook strap according to claim 2, wherein the closure member is rigid.

4. The hook strap according to claim 2, wherein the closure member is flexible.

5. The hook strap according to claim 2, wherein the closure member is a band of a flexible elastomeric polymer.

6. The hook strap according to claim 5, wherein the lipped edge has a slot and the formation of the closure member includes a narrowed section that fits into the slot and a wider section having corners that form edges of the narrowed section and catch under the lipped edge of the distal leg portion of the hook.

7. The hook strap according to claim 1, wherein the projection on the distal leg portion of the hook is a stud that protrudes outwardly from a surface of the distal leg portion opposite from the receptacle, and the formation on the closure member is an aperture that receives the stud.

8. The hook strap according to claim 7, wherein the closure member has a plurality of apertures spaced apart from each other and from the second end, each of which can receive the stud.

9. The hook strap according to claim 1, wherein the hook is of molded plastic.

10. A hook strap for holding an auxiliary piece of luggage on a main piece of luggage, comprising
    a strap having a first end and a second end, the first end being adapted to be attached to the main piece of luggage;
    a rigid generally J-shaped hook of molded plastic having a proximal leg portion, a distal leg portion and a loop portion between the leg portions defining a receptacle that is adapted to receive a part of the auxiliary piece of luggage, the proximal leg portion of the hook being attached to the second end of the strap and the receptacle having a top opening above the loop portion and between the leg portions to permit the part of the auxiliary piece of luggage to be received and held in the receptacle; and
    a closure member of a flexible elastomeric polymer having a first end and a second end, the first end of the closure member being joined to the proximal leg portion of the hook, the closure member extending across the top opening of the hook from the proximal leg portion of the hook and having the second end spaced apart from the distal leg portion of the hook in a direction opposite from the proximal leg portion, the closure member having a formation spaced apart from the second end that detachably couples to a projection on the distal leg portion of the hook so as to fasten the closure member to the distal leg portion and prevent the part of the auxiliary piece of luggage from being dislodged from the receptacle, and the closure member being displaceable distally of the distal leg portion of the hook and away from the receptacle when the formation on the second end is uncoupled from the projection to a position spaced apart from the opening so as to enable the part of the auxiliary piece of luggage to be inserted into and removed from the receptacle through the opening.

11. The hook strap according to claim 10, wherein the projection on the distal leg portion of the hook is a lipped edge and the formation snaps over and catches under the lipped edge.

12. The hook strap according to claim 11, wherein the lipped edge has a slot and the formation of the closure member includes a narrowed section that fits into the slot and a wider section forming with the narrowed section corners that catch under the lipped edge of the distal leg portion of the hook.

13. The hook strap according to claims 10, wherein the projection on the distal leg portion of the hook is a stud that protrudes outwardly from a surface of the distal leg portion opposite from the receptacle, and the formation on the closure member is an aperture that receives the stud.

14. The hook strap according to claim 13, wherein the closure member has a plurality of apertures spaced apart from each other and from the second end, each of which can receive the stud.

15. A hook strap for holding an auxiliary piece of luggage on a main piece of luggage, comprising a strap having a first end and a second end, the first end being adapted to be attached to the main piece of luggage;

a rigid generally J-shaped hook of molded plastic having a proximal leg portion, a distal leg portion and a loop portion between the leg portions, the leg portions and loop portion defining a receptacle that is adapted to receive and hold a part of the auxiliary piece of luggage, the proximal leg portion of the hook being attached to the second end of the strap, the receptacle having a top opening between the leg portions to permit the part of the auxiliary piece of luggage to be received into and removed from the receptacle, and the distal leg portion of the hook having a lipped edge with a slot therein; and a band-like closure member of a flexible elastomeric polymer having a first end and a second end, the first end of the closure member being joined to the proximal leg portion of the hook, the closure member extending across the top opening of the hook from the proximal leg portion of the hook and having the second end spaced apart from the distal leg portion of the hook in a direction opposite from the proximal leg portion, the closure member having a narrowed section spaced apart from the second end that fits into the slot and a wider section between the narrowed section and the second end forming with the narrowed section corners that catch under the lipped edge of the distal leg portion of the hook so as to couple the closure member to the distal leg portion and prevent the part of the auxiliary piece of luggage from being dislodged from the receptacle, and the closure member being displaceable distally of the distal leg portion of the hook and away from the receptacle when the corners are disengaged from the lipped edge to a position spaced apart from the opening so as to enable the part of the auxiliary luggage to be inserted into and removed from the receptacle through the opening.

\* \* \* \* \*